United States Patent [19]

Sherwin

[11] 4,277,027
[45] Jul. 7, 1981

[54] TOWABLE CENTER-PIVOT IRRIGATION SYSTEM

[75] Inventor: Owen W. Sherwin, Omaha, Nebr.
[73] Assignee: Valmont Industries, Inc., Valley, Nebr.
[21] Appl. No.: 46,336
[22] Filed: Jun. 7, 1979
[51] Int. Cl.³ .............................................. B05B 3/00
[52] U.S. Cl. .................................... 239/177; 239/710
[58] Field of Search ............... 239/177, 212, 213, 281, 239/279, 285, 710; 137/344; 172/23, 24, 25; 285/9 R

[56] References Cited

U.S. PATENT DOCUMENTS

| | | | |
|---|---|---|---|
| 3,659,627 | 5/1972 | Zimmerer et al. | 239/177 |
| 3,750,953 | 8/1973 | Reinke | 239/177 |
| 3,782,408 | 1/1974 | Martin | 239/177 |
| 3,817,455 | 6/1974 | Cornelius | 137/344 |
| 3,951,165 | 4/1976 | Seger et al. | 137/344 |
| 4,163,459 | 8/1979 | Hegeman | 239/213 |

*Primary Examiner*—James B. Marbert
*Attorney, Agent, or Firm*—Rogers, Eilers & Howell

[57] ABSTRACT

A towable center-pivot irrigation system having a liquid conduit communicating with a liquid source and extending generally radially from a center-pivot location. The conduit is supported along its length by spaced support towers which move in generally circular paths about the pivot location. Liquid dispensers are spaced along the conduit. At the pivot location, the system has a pivot assembly which structurally supports the end of the conduit near the pivot location above the ground. During operation of the system the structural support turns with the system about the pivot location.

8 Claims, 5 Drawing Figures

TOWABLE CENTER-PIVOT IRRIGATION SYSTEM

BACKGROUND AND SUMMARY OF THE INVENTION

This invention generally relates to a center-pivot irrigation system of the towable type. Generally, such systems are similar in operation, but are shorter in length, than the standard center-pivot system which may be as much as a quarter of a mile long and longer. A towable system is used where it is desirable to irrigate more than one section of land with a single center-pivot system, thus requiring the towing of the system from one location to another.

Towable systems have long been known in the art and generally include a main conduit extending generally radially from a central pivot location. The conduit is supported along its length by a series of self-propelled support towers which travel on wheels driven to move in generally circular paths about the pivot location. Sprinklers are spaced along the conduit to dispense the liquid onto the field to be irrigated.

Unlike standard center-pivots wherein the end of the conduit at the pivot is attached to a substantially permanent support structure, a towable system must have an assembly at the pivot that effectively pivotally anchors and supports the system during operation in irrigating the field, but which may be readily disengaged from its ground support and its liquid supply and adapted for towing the entire system to a new location.

Examples of structures heretofore used to anchor and support a towable system at the pivot location have been generally tripod type structures mounted on wheels, with the tripod structure remaining pivotally stationary as the system operates. In such assemblies the conduit is connected to the tripod structure by a swivel connection.

There have been a number of disadvantages associated with such prior structures. The pivot assemblies are substantially different in structure than the other support towers used in the system and are generally heavier and more massive, with associated disadvantages in cost, inventory, and the like. Because the pivot support remains stationary during operation of the system, the conduit and the wheels of the support towers may not be in proper alignment with the wheels of the pivot support for towing the system, thus requiring that the pivot support be "jockeyed" into proper alignment in relatively close quarters and usually on wet ground. Also, because the entire pivot support structure is free to pivot relative to the rest of the system, it may be impractical to tow the system from the outer end of the conduit. Such pivot assemblies are usually wider than the remaining support towers with resultant excessive crop loss in moving the system.

Such prior systems also require collector rings at the pivot with associated electrical problems, and a flexible connection where the conduit connects to the pivot support to accommodate for variations in terrain over which the system moves.

The system of the present invention overcomes these and other problems associated with prior systems in providing a pivot assembly with a structural support which in effect turns or circles about the pivot location rather than remaining pivotally stationary. Much of the design of the pivot assembly is the same as the other support towers used to support the conduit to substantially reduce cost, and is of the same width to minimize crop damage. Because the structural portion of the pivot assembly that supports the end of the conduit near the pivot location turns as the system pivots, the pivot assembly is always in alignment with the pipe for ready towing of the system by either straight towing or at an angle and regardless of its location. Because the pivot support structure pivots with the pipeline, sufficient structure for towing may be permanently included without the need to install special towing cables which must be removed for normal system operation. Its relatively light weight pivot assembly makes it possible to tow the system from either the pivot end or the outer end of the conduit. No collector ring is necessary.

The towable system of the present invention is easy to connect and disconnect at a given pivot location. The pivot assembly has a connector for pivotally anchoring the system that is movable into and out of engagement with the ground, such as a hole formed in the ground. The connector remains pivotally stationary relative to the ground, and attaches to the conduit and the liquid source for supplying liquid to the system. No elaborate preparation at the pivot location is required, and the engagement of the connector with the ground is sufficiently loose to accommodate variations in terrain over which the system operates.

These and other advantages are apparent from the drawing and detailed description to follow.

DESCRIPTION OF THE DRAWING

FIG. 4 is a view in section taken generally along the line 4—4 of FIG. 3;

FIG. 5 is a view taken generally along the line 5—5 of FIG. 4.

DETAILED DESCRIPTION OF A PREFERRED EMBODIMENT

Figure 1:
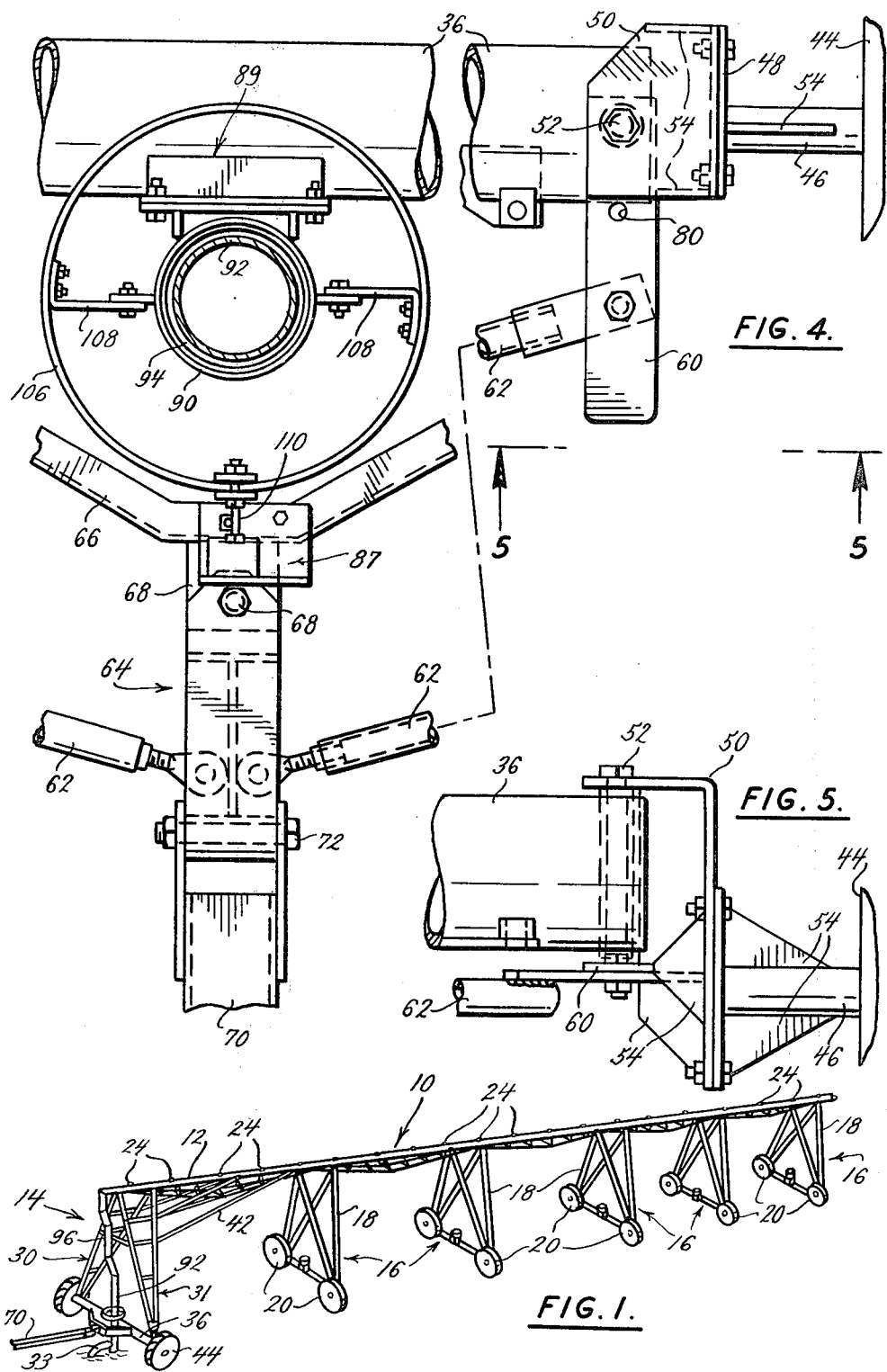
FIG. 1 is an isometric, generally schematic, view of a typical towable center-pivot irrigation system of the present invention.

Referring to the drawing, and initially FIG. 1, there is shown a towable center-pivot irrigation system 10 of the present invention including a liquid conduit 12 extending generally radially from a pivot location 14 and supported above the ground along its length by a series of support towers 16. Each support tower 16 may be of one or more of the types well known in the art which includes a rectangular frame 18 supported on the ground by wheels 20 which are driven to move in generally circular paths about the pivot location 14 such as by electric, hydraulic, or some other suitable power means. Each of the wheels 20 has a suitable gear box (not shown) associated therewith with provision for moving the wheel from an operating position as shown to a tow position with the wheel axis generally transverse to the conduit 12. Such gear boxes for towable systems need not be described as they are well known in the art.

It is to be understood that the towable system 10 has one or more spans that actually form the conduit 12, there being a span for each support tower 16. The spans are connected by a suitable flex joint and are maintained in alignment as the system operates, as well known in the art. Also, a plurality of spaced liquid dispensers or sprinklers 24 are mounted along the conduit for dispensing liquid, such as water, liquid fertilizer, or the like from the conduit onto the field, also as is well known in the art.

Figure 2:
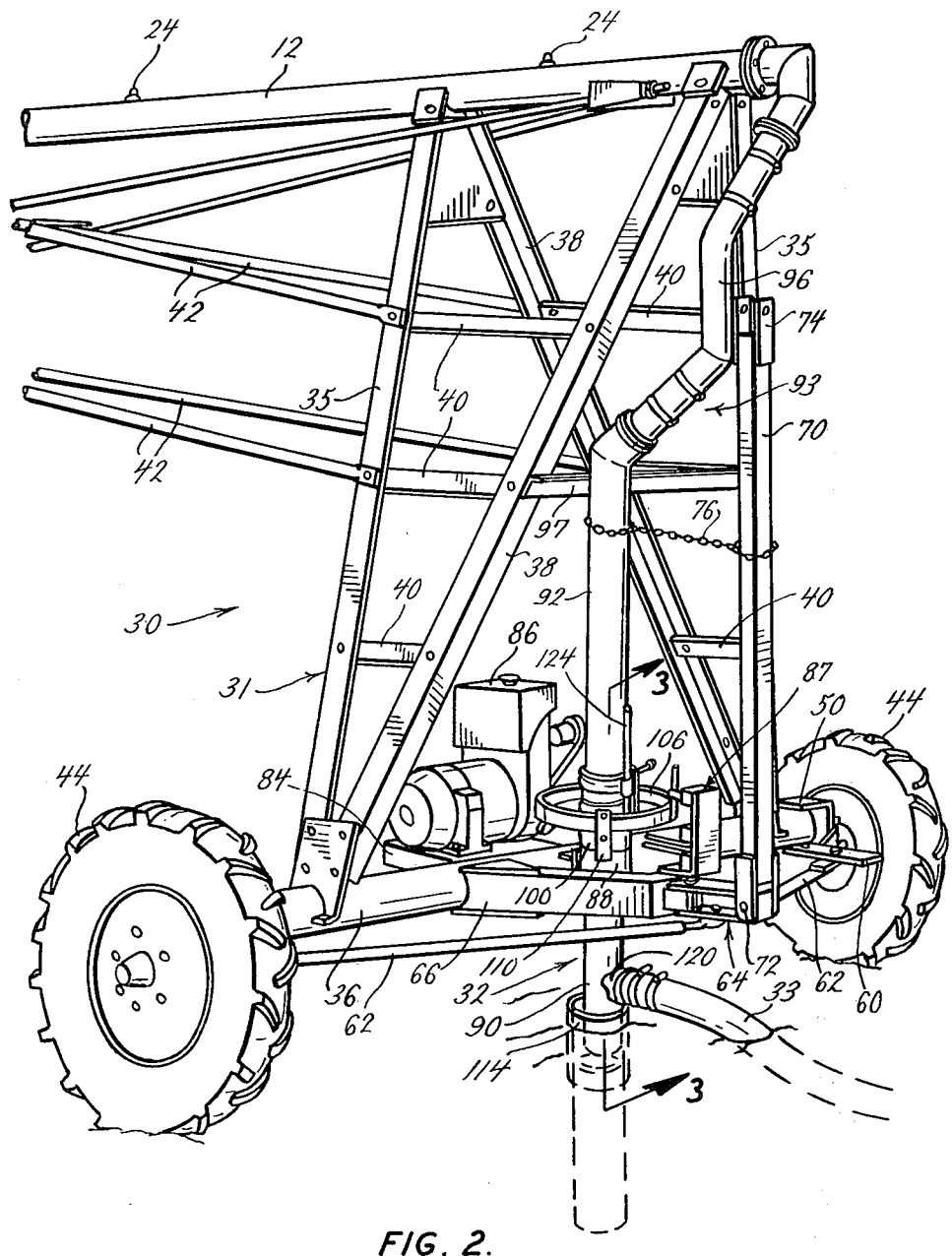
FIG. 2 is an isometric view of the pivot assembly of the system of FIG. 1 and incorporating the present invention.

The end of the conduit near the pivot location 14 is supported and pivotally anchored by a pivot assembly 30 as best shown in FIG. 2. The pivot assembly 30 generally includes a structural support assembly 31 for supporting the conduit 12 above the ground at the pivot location, and a connector assembly 32 for pivotally anchoring the system at the pivot location and for connecting the conduit 12 to a suitable liquid source such as a water hose 33.

The support structure 31 is a generally triangular frame having side frame assemblies 35 secured at the top to the conduit 12 near the end of the conduit located at the pivot. The members 35 diverge as they extend downwardly from the conduit with the bottom ends connected to a transverse pipe 36 forming the lower side of the triangular structure. Each of the side frame members 35 is formed from angle members 38 in a V design as shown, with cross support angle members 40. Tie-rods 42 extend between the pivot assembly 30 and the pipe span structure to support the pivot assembly against moment forces during operation of the system. While four such tie-rods 42 are shown, additional tie-rods may be used as appropriate.

The triangular frame structure just described as part of the structural support of the pivot assembly, is relatively light and small in profile as compared to typical pivot assemblies, and is generally the same as that used at each of the support towers 16 so that there is substantial uniformity of parts to minimize costs.

Wheels 44 are mounted at each end of the transverse pipe 36. With reference to FIGS. 2, 4 and 5, each wheel is mounted for freewheeling on a stub axle 46, the inner end of which is secured to a plate 48. The plate 48 is secured to a bracket 50, which is mounted for pivotal movement about a generally vertical axis by means of a pin assembly 52 extending through the bracket 50 and the pipe 36 near its end. The plate 48 and bracket 50 are supported by suitable gussets 54.

An arm 60, which is part of the bracket 50, extends forwardly from the pipe such that pivotal movement of the arm 60 affects pivoting of the bracket 50, and thus steering of the wheels 44. Steering linkages 62 are connected between the arms 60 and a tongue assembly 64 mounted at the end of a V shaped frame support 66 extending forwardly from the pipe 36. The tongue assembly 64 is pivotally mounted about a vertical axis to the V shaped frame 66 by means of a pin 68. A tow handle 70 is pivotally mounted on a transverse axis at its lower end to the forward end of the tongue assembly 64 by means of a pin 72 so that the handle 70 may be lowered to a position for attachment to a towing vehicle, such as a tractor or the like, and a raised or stored position as shown in FIG. 2. The free end of the handle 70 has a suitable bracket 74 for attachment to the towing vehicle, and a chain 76, or other suitable means is provided for holding the handle in the stored position.

The arms 60 have holes 80 located directly adjacent the pipe 36 to receive pins to lock the arm against pivotal movement so that the wheels cannot steer during operation of the system in irrigating the field. The wheels are made to steer only when the system is being towed from one position to another and this is accomplished by removing the locking pin from the hole 80 which allows pivotal movement of the handle 70 and tongue assembly 64 to impart pivotal movement to the arms 60 through the linkages 62, thus causing the wheels to steer as necessary in towing the system from one location to another.

Also included with structural support assembly 31 is a platform 84 attached to the pipe 36 for supporting a generator set 86 for supplying electrical power to the system if required. Actuators 87 are mounted at the rearward end of the V shaped support 66 for controlling various system operations such as for stopping the system at selected locations, end gun control, automatic reverse, and the like. A mounting sleeve 88 is located within the V shaped support 66 and secured to the pipe 36 by means of a support bracket 89.

The entire structural support assembly 31 just described effectively turns or pivots about the pivot location 14 as the entire irrigation system pivots in irrigating the field, with the wheels 44 moving in a generally circular path about the pivot location. Therefore, during system operation, the wheels 44 of the pivot assembly are always in proper alignment for immediate towing and there is no need to maneuver the pivot assembly to achieve alignment.

The connector assembly 32 includes a sleeve 90 slidingly engaged with the lower end 92 of a generally downwardly extending portion 93 of the conduit 12 at the end of the conduit near the pivot location. A suitable seal 94 is located between the sleeve 90 and the lower end 92. The downward extending portion 93 of the conduit 12 may be formed entirely of rigid pipe or may have a flexible hose portion 96 for ease in alignment of the various conduit portions as shown. If a flexible hose section is used, additional bracing may be required such as the brace 97 secured to the pipe 93 and frame members 35.

The sleeve 90 extends from the lower end 92 of the conduit and generally downwardly through and in sliding engagement with, an upper sleeve 100 and thence the mounting sleeve 88.

Figure 3:
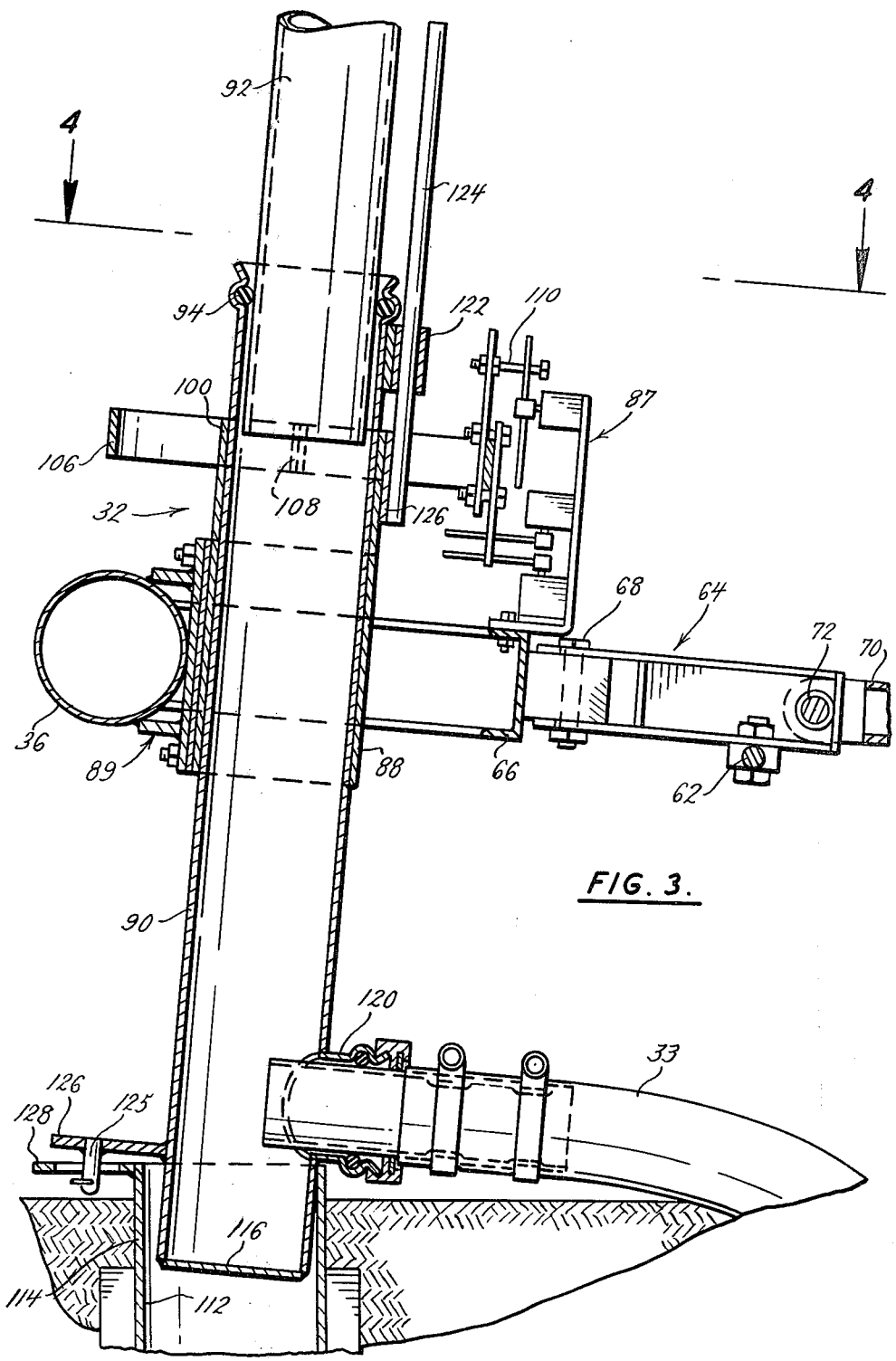
FIG. 3 is an enlarged view in section taken generally along the line 3—3 of FIG. 2.

A control assembly, in the form of a ring 106, surrounds the upper sleeve 100 and is connected thereto by supports 108 (FIGS. 3 and 4). The control assembly or ring 106 has members 110 for selectively engaging the actuators 87 upon relative pivotal movement of the structural support assembly 31 and connector assembly 32 for controlling various system operations.

The lower end of the sleeve 90 extends generally downwardly into a ground support such as an encased hole 112. The hole is easily encased by use of a pipe section 114. The diameter of the pipe section 114 should be sufficiently greater than that of the lower end of the sleeve 90 to provide a relatively loose fit for ease in inserting and retracting the lower end of the sleeve from the hole and to allow pitch changes in the sleeve caused by terrain variations over which the irrigation system moves during its operation. In this way, the sleeve 90 is allowed to pitch within the hole 112 to accommodate terrain variations.

The lower end of the sleeve 90 is capped at 116 and a fitting 120 is located in the wall of the sleeve 90 spaced above the lower end of the sleeve to provide sufficient extension of the sleeve into the hole. The fitting 120 is for connection of the sleeve, and thus the conduit 12, to the liquid supply 33.

Near the upper end of the sleeve 90, and on the outer side thereof is secured an eyelet 122 through which a rod 124 extends in sliding engagement. The lower end of the rod 124 is secured to the sleeve 100 as at 126. Thus, the rod 124 allows the sleeve 90 to be moved up and down relative to the sleeve 100 but holds the sleeve 100, and the control ring 106 attached thereto, against turning by its connection to the sleeve 90 through the eyelet 122. The sleeve 90 is secured against rotation relative to the pipe section 114 by a pin 125 loosely connected through a plate 126 attached to the sleeve 90 and a plate 128 attached to the pipe section 114.

OPERATION

When the system is operating to irrigate the field, the wheels 20 of the support towers 16 are oriented with their axes generally parallel to the conduit 12 so as to move in generally circular paths about the pivot location 14. The wheels 44 are oriented in axial alignment and with their axes generally transverse to the conduit 12, the wheels 44 being locked in that position by means of a lock pin inserted in the hole 80. The tow handle 70 is in the stored position as shown in FIG. 2. The liquid supply hose 33, or other suitable liquid supply source, is connected to the sleeve 90 to supply water, or other liquid, into the sleeve, through the conduit 12, and out the sprinklers 24 to irrigate the field. The lower end of the sleeve 90 extends within the hole 112 in the ground as shown in FIGS. 2 and 3. Electrical power, if appropriate, is supplied to the system including the wheels of the support towers 16 by means of the generator set 86 to cause the system 10 to pivot generally about the pivot location 14.

As the wheels 20 of the support towers move in generally circular paths around the pivot location, the wheels 44 move in a freewheeling manner also in a generally circular path about the pivot location with the entire structural support assembly 31, including the frame members 35, 36 and 66, the wheels 44, linkages 62, tongue assembly 64, handle 70, platform 84, generator set 86 and actuator assembly 87 turning about the pivot location as the system pivots during its operation. The downwardly extending portion 93 of the conduit 12 also turns about the pivot location along with the structural support assembly 31.

The sleeve 90 and the control ring 106 remain pivotally stationary, with the lower end 92 of the conduit portion 93 rotating within the upper end of the sleeve 90, and the sleeve 88 connected to the transverse pipe 36 also rotating about the sleeve 90. As the system operates, the actuators 87 selectively engage the members 110 of the control ring 106 to control various system operations.

To tow the system, the wheels 20 of the drive units 16 are oriented with their axes generally transverse of the conduit 12. The water source 33 is disconnected from the sleeve 90, and the sleeve is retracted or made to slide upwardly relative to the sleeves 88 and 100 and conduit portion 92 to withdraw the lower end of the sleeve 90 from the casing 114 and allow sufficient clearance above the ground for towing. Raising of the sleeve 90 may be facilitated by a small winch (not shown) that may be mounted to the structural support assembly 31 if desired. In raising the sleeve 90 the vertical location of the control ring 106 is not disturbed because of the sliding engagement of the eyelet 122 and rod 124.

The pin that prevents steering of the wheels 44 is removed from the hole 80 and the handle 70 is lowered and attached to the towing vehicle. Towing is greatly faciliated by the fact that regardless of the position of the system when it is stopped, the pivot assembly is always in proper alignment with the remainder of the system for towing. As the system is towed from one position to another, movement of the handle 70 causes proper steering of the wheels 44 through the linkages 62.

Once to the new location, the procedure is simply reversed with the sleeve 90 made to slide downwardly into a similar casing 114 at the new location, and connected to another suitable liquid source.

Because the structural support assembly 31 is not used as a pivot anchor, the structure can be lighter and less massive than would be otherwise required. This allows towing of the system from either end and also allows the width profile of the pivot assembly 30 to be the same as that of the drive units so the wheels 44 and 20 track in the same path for minimum crop loss in moving the system.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. A towable center-pivot irrigation system having a liquid conduit communicating with a liquid source and extending generally radially from a central pivot location, the conduit being supported along its length by spaced support towers movable is generally circular paths about the pivot location, a plurality of liquid dispensers spaced along the conduit for dispensing liquid fed through the conduit onto the field to be irrigated, a pivot assembly for pivotally locating said system and supporting said conduit at the pivot location, said pivot assembly further comprising a structural assembly supporting the end of the conduit near the pivot location above the ground, the structural assembly being supported on a plurality of circumferentially spaced wheels which turn in a generally circular path about the pivot location as the system operates in irrigating the field, the conduit at the pivot location having a generally downwardly extending portion, and a sleeve slidingly engaged with the generally downwardly extending portion of the conduit to slide axially relative thereto, the lower end of said sleeve being engaged with the ground in a lowered position for operation of the system and disengaged with the ground in a raised position for towing the system.

2. The irrigation system of claim 1 wherein the system pivots relative to the sleeve, and said liquid source communicates with the conduit by attachment at the sleeve.

3. A towable center-pivot irrigation system having a liquid conduit communicating with a liquid source and extending generally radially from a central pivot location, the conduit being supported along its length by spaced support towers movable in generally circular paths about the pivot location, a plurality of liquid dispensers spaced along the conduit for dispensing liquid fed through the conduit onto the field to be irrigated, a pivot assembly for pivotablly locating said system and supporting said conduit at the pivot location, said pivot assembly further comprising a structural assembly supporting the end of the conduit near the pivot location above the ground, said structural assembly turning about the pivot location upon pivotal operation of the system in irrigating the field and supported on a plurality of wheels each of which turn in a generally circular path about the pivot location as the system operates, the conduit at the pivot location having a generally downwardly extending portion, and a sleeve slidingly engaged with the downwardly extending portion of the conduit to slide axially relative thereto, the lower end of the sleeve being engaged with the ground in a lowered position for operation of the system and disengaged with the ground in a raised position for towing the system.

4. The irrigation system of claim 3 further comprising a casing mounted in the ground with which the lower end of said sleeve is engaged, said engagement with said casing being sufficiently loose for ease of engagement and disengagement and to accommodate pitch variations in the sleeve caused by terrain variations over which the system travels.

5. The irrigation system of claim 3 further comprising a control assembly, and means for mounting said control assembly on the sleeve to remain pivotally stationary with said sleeve and for relative sliding movement of the sleeve and control assembly, and means mounted to the structural assembly for selective engagement with the control assembly due to relative pivotal movement of the structural assembly and the control assembly as the system operates.

6. The irrigation system of claim 3 wherein the system pivots relative to said sleeve, said liquid source communicating with the conduit by attachment at the sleeve.

7. A towable center-pivot irrigation system having a liquid conduit communicating with a liquid source and extending generally radially from a central pivot location, the conduit being supported along its length by spaced support towers movable in generally circular paths about the pivot location, a plurality of liquid dispensers spaced along the conduit for dispensing liquid fed through the conduit onto the field to be irrigated, a pivot assembly for pivotally locating said system and supporting said conduit at the pivot location, said pivot assembly being supported on a plurality of wheels which turn in a generally circular path about the pivot location as the system operates, said conduit at the pivot location having a generally downwardly extending portion, and a sleeve slidingly engaged with the generally downwardly extending portion of the conduit to slide axially relative thereto, the lower end of said sleve being engaged with the ground in a lowered position for operation of the system and disengaged with the ground in a raised position for towing the system.

8. The irrigation system of claim 7 wherein the system pivots relative to said sleeve, said liquid source communicating with the conduit by attachment at the sleeve.

* * * * *